United States Patent Office 3,408,426
Patented Oct. 29, 1968

3,408,426
O,O-DIISOPROPYL-ETHYLSULFINYLMETHYL-DITHIOPHOSPHATE
Takashi Yamamoto and Shuichi Kobayashi, Fujisawa, Kentaro Nakatomi, Minato-ku, Tokyo, Saburo Takahashi, Kamakura, and Hideo Ueda and Mamoru Kondo, Fujisawa, Japan, assignors to Hokko Chemical Industry Co., Ltd., Chiyoda-tu, Tokyo, Japan, a corporation of Japan
No Drawing. Filed June 18, 1964, Ser. No. 376,269
Claims priority, application Japan, June 22, 1963, 38/32,507
1 Claim. (Cl. 260—948)

ABSTRACT OF THE DISCLOSURE

Insecticidal compositions containing O,O-diisopropyl-ethylsulfinylmethyl-dithiophosphate.

---

This invention relates to insecticidal compositions for agriculture, more particularly to those containing as an active ingredient O,O-diisopropyl-ethylsulfinylmethyl-dithiophosphate.

O,O - diethyl - ethylthiomethyl-dithiophosphate sold under the trade name of Thimet or Phorate has been considered promising as an agricultural chemical by virtue of its strong systemic insecticidal activity and is actually put into practical use in abroad as a seed-dressing chemical. The above compound, however, is highly toxic to warmblooded animals (the mouse oral toxicity, $LD_{50}$, is 1–4 mg./kg.) and hence the use of said compound has not been permitted in those countries where agriculture is mainly dependent upon the labor of men and cattle. In order to put the excellent insecticidal effect of Thimet into practical use in some forms, a large number of researchers have studied the activity mechanism of Thimet in the bodies of plants, insects, men and cattle to confirm that both O,O-diethyl-ethylsulfinylmethyl-dithiophosphate and O,O - diethyl-ethylsulfonylmethyl - dithiophosphate, which are formed by the metabolism of Thimet in living bodies, give to men and cattle a high toxicity identical with or higher than that of Thimet and hence are not suitable for practical use in agriculture.

It is quite desirable from the standpoints of modernized agriculture and of economy to provide a systemic insecticide which, by single application, can provide a long lasting insecticidal activity against suctorial insects, such as leafhoppers, aphdes, and mites, for such a long period as 1 to 2 months and which is so low in toxicity as to be practically permissible.

According to the research of the present inventors, it has been found that, in spite of its being a compound similar to Thimet, O,O-diisopropyl-ethylsulfinylmethyl-dithiophosphate has a toxicity to men and cattle more than 20 times as low as that of Thimet and is more stable than Thimet in plant bodies and in a wide pH range (1–13) and, when absorbed in plant bodies through their roots, the compound shows an insecticidal activity well comparable to Thimet for a long period of time. It is a generally admitted fact that, in a series of phosphates, thiophosphates and dithiophosphates, O,O-diisopropyl esters are low in insecticidal activity as compared with O,O-dimethyl and O,O-diethyl esters. It is therefore surprising that practically usable insecticidal compound comparable to conventional insecticidal compounds has been found from the former esters.

The O,O - diisopropyl - ethylsulfinylmethyl-dithiophosphate, the active ingredients of the present invention, which is a novel compound unknown in the literature, is obtained by oxidizing O,O-diisopropyl-ethylthiomethyl-dithiophosphate ether with hydrogen peroxide in a water-soluble solvent, and has $N_D$ of 1.5278/16.5° C. and a specific gravity $D_4^{20}$ of 1.166.

The following tests for the exterminaion of insects show the effectiveness of the present composition:

A. Extermination test of two spotted red spiders by pouring 30 cc. of a 0.01% aqueous solution of a 50% emulsion (containing 3.0 mg. of an active ingredient) comprising 50 parts of a test compound and 50 parts of an emulsifier was poured in the soil placed in an unglazed pot with an inner diameter of 8.5 cm., in which has been grown to a height of 15 cm. a kidney bean plant parasitized with 20 adults per leaf, in average, of two spotted red spiders. When given days had elapsed after the pouring, the number of insects parasitized on newly grown leaves was investigated to obtain the following results:

Test compounds:

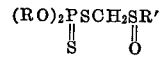

and

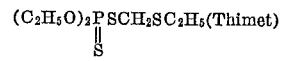

| Test compound | | Number of parasitized spiders per leaf | |
|---|---|---|---|
| R | R' | After 12 days | After 36 days |
| Iso-$C_3H_7$ | $C_2H_5$ | 0 | 0. |
| Iso-$C_3H_7$ | Iso-$C_3H_7$ | 20 | Plant body died. |
| Iso-$C_3H_7$ | n-$C_4H_9$ | 0 | Do. |
| Iso-$C_3H_7$ | t-$C_4H_9$ | 0 | Do. |
| Thimet | | 0 | 0. |
| Control | | 24.7 | Plant body died. |

As is clear from the above table, only the active ingredient of the present invention gave the same effect as that of Thimet.

B. Extermination test of green rice leafhopper by root-soaking

The roots of aquatic rice seedlings with a height of 10 cm. were immersed, respectively, for 24 hours so as not to injure the roots, in 0.05, 0.025 and 0.01% solutions of a 50% emulsion of each test compound and the seedlings were then transferred into pots with an inner diameter of 15 cm. After 15 and 33 days, the seedlings were subjected for 24 hours to the attack of green rice leafhopper adults and the number of killed leafhoppers was calculated. That is, the test was directed to investigate the number if insects killed by sucking the juice of plant which had been poisoned by the chemical through the soaked roots.

The results obtained were as follows:

| Test compound | | Rootsoaking concentration, percent | Rate of green rice leafhopper killed, percent | | Detrimental effect |
|---|---|---|---|---|---|
| R | R' | | After 15 days | After 33 days | |
| Iso-$C_3H_7$ | $C_2H_5$ | 0.05 | 100 | 85 | — |
| | | 0.025 | 100 | 75 | — |
| | | 0.01 | 80 | 60 | — |
| Iso-$C_3H_7$ | Iso-$C_3H_7$ | 0.05 | 70 | 45 | — |
| | | 0.025 | 60 | 30 | — |
| | | 0.01 | 50 | 20 | — |
| Iso-$C_3H_7$ | n-$C_4H_9$ | 0.05 | 80 | 55 | — |
| | | 0.025 | 70 | 40 | — |
| | | 0.01 | 60 | 30 | — |
| Iso-$C_3H_7$ | t-$C_4H_9$ | 0.05 | 80 | 50 | — |
| | | 0.025 | 75 | 40 | — |
| | | 0.01 | 60 | 25 | — |
| Thimet | | 0.05 | | | +++ |
| | | 0.025 | 100 | 85 | ++ |
| Control | | 0.01 | 95 | 55 | — |
| | | | 0 | 0 | — |

Note.—+++=Plant withered, taking no root, and died; ++=Markedly poor in growth and the height was about ⅓ as compared with the control; —= No detrimental effect observed.

As is clear from the above table, the active ingredient of the present composition is more excellent in effect than Thimet among a series of similar compounds including Thimet, and is a unique compound capable of being put into practical use without exhibiting such detrimental effect as shown by Thimet. When used in the test carried out by soaking the roots of plants in the solutions of chemicals, Thimet was marked in detrimental effect and was difficultly usable.

C. Test of residual effects of chemicals against rice aphides, observed when the chemicals are charged in pool water of pot-cultivation aquatic rice plants Aquatic rice plants of 10 cm. in height were planted in pots of 15 cm. in diameter. Into the pool water (5 cm. in depth) of each pot, each 0.1% aqueous solution of 50% emulsion was charged so that the amount of each test compound became 150 g./10 a., and the states of aphides which had been parasitized on the rice plants were investigated after the elapse of given days to obtain the following results:

| Test compound | | Parisitic rate of rice aphides, percent | |
|---|---|---|---|
| R | R' | 10 days after application | 20 days after application |
| Iso-C$_3$H$_7$ | C$_2$H$_5$ | 0 | 2 |
| Iso-C$_3$H$_7$ | Iso-C$_3$H$_7$ | 20 | 33 |
| Iso-C$_3$H$_7$ | n-C$_4$H$_9$ | 18 | 38 |
| Iso-C$_3$H$_7$ | t-C$_4$H$_9$ | 25 | 39 |
| Thimet | | 3.2 | 5 |
| Control | | 210 | 500 |

In the above table, the parasitic rate (percent) of rice aphides shows the ratio of the number of rice aphides before the application of chemicals to the number of parasitized aphides. From the above data, it is evident that the active ingredient of the present composition is more effective than Thimet. This is ascribable to the fact that, due to its excellent water-solubility, the present active ingredient is absorbed in plants through the roots thereof to exhibit the prominent effect for the prevention and extermination of suctorial insects. In the above test, the detrimental effect of Thimet was not so marked as in the test of root-soaking process, but the plants to which Thimet had been applied showed a tendency of being slowed in growth.

D. Test of toxicity to warm-blooded animals

Each test compound was mixed with an equal amount of Solpol 2020 (the trade name of an emulsifier produced by Toho Kagaku Kogyo K.K., Japan). The resulting mixture was orally administered according to conventional means to the groups of pure male mice (average body weight: 18–23 g.), each group comprising 6 mice, and the environmental temperature was maintained at 13°–16° C. After 48 hours, the number of killed mice was investigated to obtain the results shown in the following table wherein the denominator shows the number of killed mice and the numerator the number of tests effected:

The test compounds had the general formula

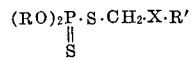

As shown in the above table, the present active ingredient (bearing the mark *) exhibits the minimum toxicity among the compounds belonging to the same series and exhibits less than 1/15–1/20 the toxicity of Thimet (bearing the mark **). The active ingredient of the present invention can pass the Japanese standard regarding the use of agricultural chemicals.

In accordance with the present invention, the novel active ingredient O,O - diisopropyl-ethylsulfinylmethyl-dithiophosphate is usable in the form of any preparations according to ordinary organic phosphorus formulations, such as emulsions, wettable powders, dusts, granules, seed-dressing chemicals, oil agents, etc. Such compositions are applicable to crops according to various means and are particularly suitable for the prevention and extermination of suctorial insects by pouring, root-soaking or charging into pool water.

The following examples illustrate the present invention:

EXAMPLE 1

950 g. of bentonite granules of 20–40 mesh were sprayed with a solution of 50 g. of O,O-diisopropyl-ethyl-sulfinylmethyl-dithiophosphate in an equal amount of acetone to obtain a uniform 5% granular formulation. The formulation was subjected to the following tests to obtain the results as set forth in the tables:

Application to soil.—Clayey soil was put in pots of 13.5 cm. in diameter, respectively. To the soil in each pot, the 5% granular formulation was added so that the amount of active ingredient became 500, 250 and 100 g. per 10 a., respectively, and water was charged in each pot to a depth of 3 cm. Into the pots, each 3 aquatic rice plants of 5 cm. in height were planted, and the depth of water was always maintained at 3 cm. After given days, the pots were covered with gauze and the plants were subjected to the attack of green rice leafhopper. 2 days later, the number of killed insects was investigated to obtain the following results:

| Chemical | Amount applied per 10 a., grams | Insecticidal rate, percent | |
|---|---|---|---|
| | | 27 days after application | 36 days after application |
| Present composition | 500 | 100 | 80 |
| | 250 | 90 | 60 |
| | 100 | 70 | 50 |
| Thimet | 500 | 100 | 80 |
| | 250 | 90 | 60 |
| | 100 | 70 | 50 |
| Control | | 0 | 0 |

Application to water.—Onto the surface of water of aquatic rice plants of 10 cm. in height planted, respectively, in a pot with a diameter of 13.5 cm., the 5% granular formulation was uniformly applied so that the amount of active ingredient per 10 a. was 500, 250 and 100 g., respectively, and the depth of water was maintained at 3 cm. When given days had elapsed after the application, each pot was covered with gauze and green rice leafhopper adults were introduced into the gauze.

| Test compound | | | Administrated amount | | | |
|---|---|---|---|---|---|---|
| R | X | R' | 3 mg./kg. | 10 mg./kg. | 30 mg./kg. | 100 mg./kg. |
| C$_2$H$_5$ | SO | C$_2$H$_5$ | 6/6 | | | |
| iso-C$_3$H$_7$ | SO | C$_2$H$_5$* | | 0/6 | 0/6 | 6/6 |
| iso-C$_3$H$_7$ | SO | iso-C$_3$H$_7$ | | 0/6 | 1/6 | 6/6 |
| iso-C$_3$H$_7$ | SO | C$_4$H$_9$ | | 0/6 | 1/6 | 6/6 |
| iso-C$_3$H$_7$ | SO | t-C$_4$H$_9$ | 0/6 | 3/6 | 6/6 | |
| C$_2$H$_5$ | SO$_2$ | C$_2$H$_5$ | 0/6 | 6/6 | | |
| iso-C$_3$H$_7$ | SO$_2$ | C$_2$H$_5$ | 0/6 | 1/6 | 6/6 | |
| C$_2$H$_5$ | S | C$_2$H$_5$** | 6/6 | | | |

2 days after the introduction, the number of killed insects was investigated to obtain the following results:

| Chemical | Amount applied per 10 a., grams | Insecticidal rate, percent | |
|---|---|---|---|
| | | 27 days after application | 36 days after application |
| Present composition | 500 | 100 | 90 |
| | 250 | 100 | 70 |
| | 100 | 80 | 50 |
| Thimet | 500 | 100 | 95 |
| | 250 | 100 | 80 |
| | 100 | 80 | 55 |
| Control | | 0 | 5 |

EXAMPLE 2

5 parts of O,O-diisopropyl-ethylsulfinylmethyl-dithiophosphate was added, while throughly stirring, to a mixture of 10 parts of diatomaceous earth and 35 parts of clay. To the resulting mixture, 28 parts of clay, 21 parts of talc and 1 part of microsil were further added and the mixture was subjected two times to an impact type crusher to obtain a uniform 5% dust formulation. The formulation was subjected to the following test to obtain the results as set forth in the table:

Application to soil.—Into soil charged in unglazed pots with an inner diameter of 15 cm., 1.0 g. and 0.5 g. of the 5% dust formulation were incorporated, respectively. A seed potato was planted in the soil of each pot. After given days, the leaves of potatoes were collected and were placed in petri dishes, respectively. Into the petri dishes, green peach aphides were introduced and, two days after, the number of killed aphides was investigated to obtain the following results:

| Chemical | Amount applied per pot, grams | Insecticidal rate, percent | |
|---|---|---|---|
| | | 30 days after application | 56 days after application |
| Present composition | 1.0 | 100 | 100 |
| | 0.5 | 100 | 100 |
| Thimet | 1.0 | 100 | 100 |
| | 0.5 | 100 | 100 |
| Control | | 10 | 11 |

EXAMPLE 3

50 parts of O,O-diisopropyl-ethylsulfinylmethyl-dithiophosphate was mixed with 50 parts of an active carbon powder to obtain a somewhat wet 50% seed-dressing dust formulation favorable in adhesion. The formulation was subjected to the following tests to obtain the results shown in the table:

Application to aquatic rice seeds.—Aquatic rice seeds were coated with the 50% dust formulation, so that the amount of formulation applied became 4.4% and 8.8%, respectively, based on the weight of the seeds. Each 1.5 g. of the coated seeds was sowed in soil put in pots with a diameter of 13.5 cm. When given days had elapsed after the sowing, a test of killing green rice leafhopper adults was effected to obtain the following results:

| Chemical | Weight percent of chemical based on seed weight | Insecticidal rate, percent | |
|---|---|---|---|
| | | 23 days after application | 38 days after application |
| Present composition | 8.8 | 100 | 100 |
| | 4.4 | 100 | 100 |
| Thimet | 8.8 | 100 | 100 |
| | 4.4 | 100 | 100 |
| Control | | 0 | 0 |

Test of detrimental effect.—Aquatic rice seeds were sowed after being coated with 4.4 and 8.8% by weight, based on the weight of the seeds, of the dust formulation. The seeds thus coated are effective for a considerable period against insects having suctorial mouth parts, such as green rice leaf-hoppers and smaller brown plant hoppers.

From the following table, it will be understood that, when applied, Thimet is marked in detrimental effect:

| Chemical | Weight percent of formulation based on seed weight | Results of investigation effected 20 days after application |
|---|---|---|
| Present composition | 4.4 | — |
| | 8.8 | — |
| Thimet | 4.4 | ++ |
| | 8.8 | +++ |
| Control | | |

NOTE.—— = No detrimental effect observed; ++ = Growth slowed, leaves whitened at the tips and withered; +++ = Marked in the above phenomenon.

EXAMPLE 4

50 parts of O,O-diisopropyl-ethylsulfinylmethyl-dithiophosphate was mixed with 10 parts of xylene and 40 parts of Solpol 2020 (the trade name of a product of Toho Kagaku Kogyo K.K.) to obtain a soluble 50% emulsion. The emulsion was subjected to the following test to obtain the results as set forth in the table:

Pouring test.—A 0.01% aqueous solution of the 50% emulsion was poured onto cabbages of 10 cm. in height planted in unglazed pots with a diameter of 12 cm., so that the amount of active ingredient per pot became 10, 5, 2.5 and 1 mg., respectively.

| Chemical | Amount poured per pot, mg. | Rate of survival raddish aphides, percent | |
|---|---|---|---|
| | | After 5 days | After 10 days |
| Present composition | 10 | 0 | 0 |
| | 5 | 0 | 0 |
| | 2.5 | 20.2 | 4.5 |
| | 1 | 25.7 | 15.1 |
| Thimet | 10 | 0 | 0 |
| | 5 | 0 | 0 |
| | 2.5 | 13.5 | 0 |
| | 1 | 20.5 | 5.1 |
| Control | | 37 | 61.3 |

EXAMPLE 5

18 parts of O,O-diisopropyl-ethylsulfinyldithiophosphate was added to 72 parts of diatomaceous earth and the mixture was thoroughly stirred. To the mixture, 2 parts of Nissan Wet (the trade name of a product of Nissan Kagaku K.K.), 2 parts of sodium lignin sulfonate and 6 parts of clay were added. The resulting mixture was subjected to an impact type crusher to form a uniform 18% wettable powder. The results of test applied to the formulation thus obtained were as follows:

Application to leaves.—The leaves of orange were soaked for 10 seconds in given liquid chemicals, respectively, and were allowed to stand in a hothouse for 24 hours. Aphide adults were placed on each leaf and lanolin was applied to leafstalk to prevent the aphides from moving. After 24 hours, the mitecidal rate of each chemical was investigated to obtain the following results:

| Chemical | Concentration, percent | Mitecidal rate, percent |
|---|---|---|
| Present composition | 0.018 | 100 |
| Phencaptone | 0.018 | 83.4 |
| Kelthane | 0.018 | 95.5 |
| Micadine | 0.018 | 90 |
| Meta-Systox | 0.018 | 100 |
| Control | | 0 |

What we claim is:
1. O,O - diisopropyl - ethylsulfinylmethyl - dithiophosphate.

References Cited

FOREIGN PATENTS 625,987    8/1961    Canada.

CHARLES B. PARKER, *Primary Examiner.*

A. SUTTO, *Assistant Examiner.*